INVENTOR.
STANLEY E. ZOCHOLL

March 18, 1969 S. E. ZOCHOLL 3,434,011
SATURATING CURRENT TRANSFORMER FOR STATIC RELAYS
Filed Aug. 25, 1966 Sheet 2 of 2
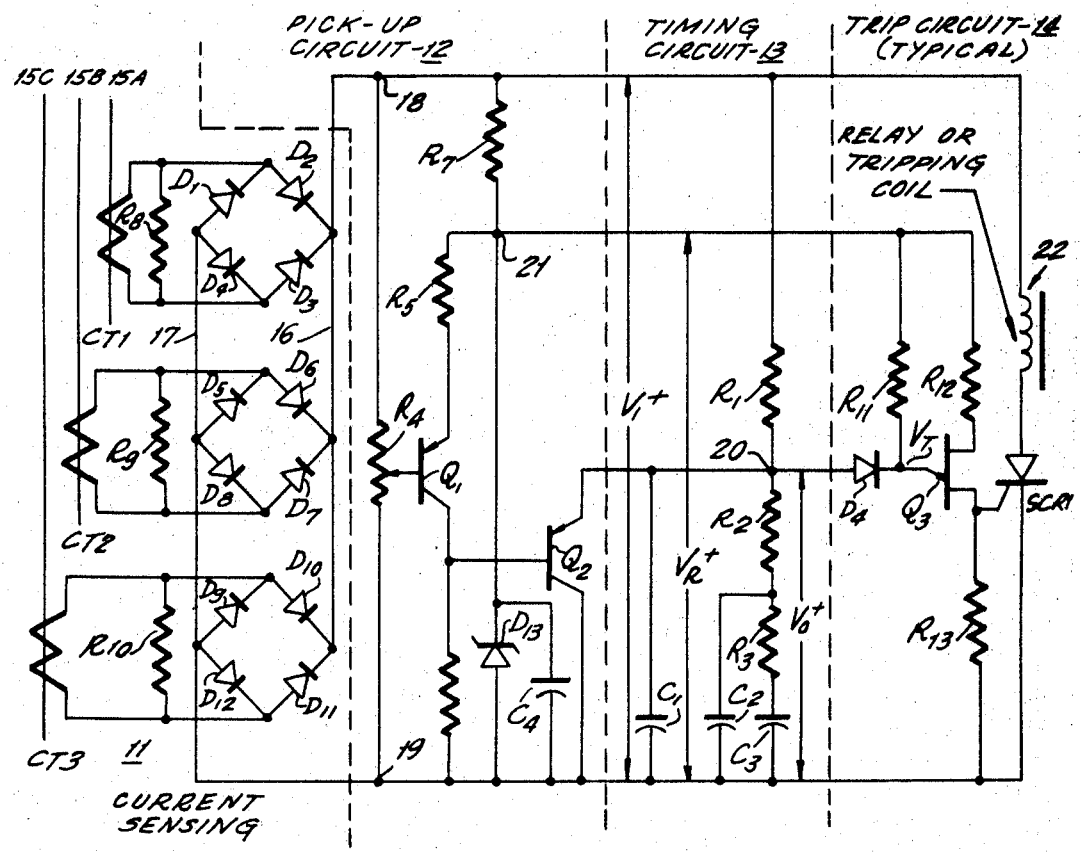
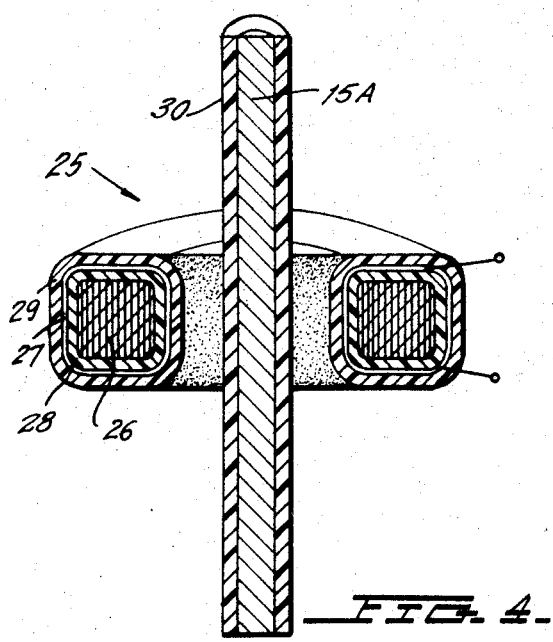
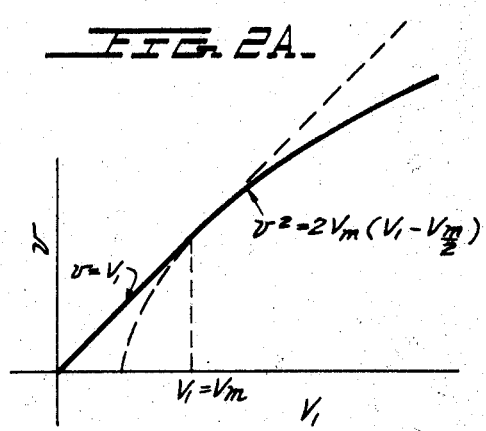
INVENTOR.
STANLEY E. ZOCHOLL
BY
OSTROLENK, FABER, GERB & SOFFEN
ATTORNEYS

United States Patent Office 3,434,011
Patented Mar. 18, 1969

3,434,011
SATURATING CURRENT TRANSFORMER FOR STATIC RELAYS
Stanley E. Zocholl, Holland, Pa., assignor to I-T-E Circuit Breaker Company, Philadelphia, Pa., a corporation of Pennsylvania
Filed Aug. 25, 1966, Ser. No. 575,020
U.S. Cl. 317—33
Int. Cl. H02h 3/20
5 Claims

ABSTRACT OF THE DISCLOSURE

A static relay device for monitoring the current in a circuit to operate protective circuitry such as circuit breakers in order to isolate the circuit being protected in the case where above normal current conditions are found to exist. Isolation of the circuit by tripping operations is controlled in an inverse time current relationship by means of a timing circuit which is prevented from timing out in the presence of normal current and does not begin time out until a pick-up circuit is operated. The timing circuit controls static means for energizing a tripping coil as soon as a threshold voltage level is achieved. In order to convert the otherwise linear relationship between time and current for the timing circuit, a current transformer is employed having a saturable core designed to saturate at a predetermined current value which flattens the steepness of the time current curve in such a way that the saturable core and its saturation level plays a significant part in the shaping of the curve characteristic for the static relay device so as to very effectively simulate the desired conventional curves previously obtainable only through the use of conventional electromagnetic overcurrent relays.

---

The instant invention relates to static relay devices and more particularly to a novel saturating current transformer for use in static relay structures to provide excellent time-current characteristics not heretofore achievable through conventional structures.

In the field of volt current monitoring devices it has been conventional in the past to employ electromechanical relays, which devices have excellent characteristics yielding the necessary time-current relationships. Electromechanical relays used for fault protection in electrical power systems, however, require a 60 cycle sine wave input current to produce their published characteristics. Since power system primary currents range from hundreds to thousands of amperes, current transformers are now conventionally employed to derive secondary current levels of a range suitable to drive the electromechanical relay devices.

Due to the sine wave requirement, the current transformer must produce a linear transformation over the range of relay operating currents. In overcurrent relays this range is at least 20 to 1. Consequently the transformer core requires a large cross-sectional area and delivers considerable power to the relay at high magnitude fault currents.

However, static overcurrent relays which are presently finding wide-spread use, typically employ some form of RC timing circuit to derive their time-current characteristics. Consequently the static relay has different input requirements as compared with the requirements of conventional electromechanical relays.

In the static relay the circuit being protected is coupled to the RC timing circuit by means of a current transformer. The secondary current of the current transformer quickly flows through a resistance referred to as a "burden" resistance in order to develop a voltage drop for activating the RC timing circuit. The output voltage developed across the burden resistance is rectified and the resulting D.C. signal drives the RC timing circuit. The output of the timing circuit is designed to require a predetermined time interval to reach a reference voltage level. When the reference voltage level is exceeded, a trip signal is initiated. The elapsed time which passes in order to reach the reference voltage is dependent on the input voltage magnitude.

If the secondary current $I_s$ developed by the current transformer is a linear function of primary current, there will be a linear relationship established for the time-current characteristics. However, conventional time-current curves, which are the preferable curves, flatten out at high values of current. The nature of the RC circuit is such that when a secondary current, which is a linear function of primary current, is presented to the input of the RC circuit the response of the timing circuit will maintain the linear time-current relationship. It therefore becomes necessary to employ some shaping technique in order to simulate the desired conventional curves.

The instant invention is characterized by providing a novel current transformer means in a static relay circuit which employs a transformer core having the capability of saturating at a particular current level which lies well within the operating range of the static relay. Use of such a saturated core, together with judicious selection of the core saturation characteristics provides a flattening of the time-current characteristic at higher current magnitudes, thereby substantially identically simulating desired time-current characteristic curves, thus yielding an extremely advantageous static relay design.

It is therefore one object of the instant invention to provide a novel current transformer for use in static relays in order to develop the desired time-current characteristic curves.

Another object of the instant invention is to provide novel transformer means for use in static relay devices which is comprised of a transformer core capable of saturating at a predetermined current level which is well within the operating range of the static relay so as to flatten the time-current characteristic curve at high magnitude current values in order to substantially identically simulate the necessary time-current relationships.

These, and other objects of the instant invention will become apparent when reading the accompanying description and drawings in which:

FIGURE 2a is a plot showing current transformer output voltage as a function of saturation current.

FIGURE 3 is a schematic diagram showing the manner in which the novel transformer of the instant invention is employed in a static relay circuit.

For an understanding of the instant invention the case will now be considered where the rectified voltage signal derived from the secondary current developed from a current transformer is applied to a filter circuit. The filter produces a D.C. voltage which is nearly equal to the peak of the input voltage. This voltage is impressed upon a simple RC timing circuit which charges to the fixed voltage reference $V_R$. The time required to exceed the reference voltage level as a function of secondary current is $$t = RC \ln \frac{V_1}{V_1 - V_R} \quad (1)$$

where:

$V_1 = I_s R_b$
$I_s = $ C.T. secondary current (peak current)

$R_b$ = Burden resistance
$RC$ = RC circuit time constant
$V_R$ = Reference voltage In Equation 1, if $I_S$ is a linear function of primary current, $t$ will be a curve on log-log paper having an assymtote at $I_S = V_R/R_b$ and the curve will have a negative slope of one (i.e., minus 1) where $T=RC$. This curve is shown in FIGURE 1 of the drawings.

Figure 1:
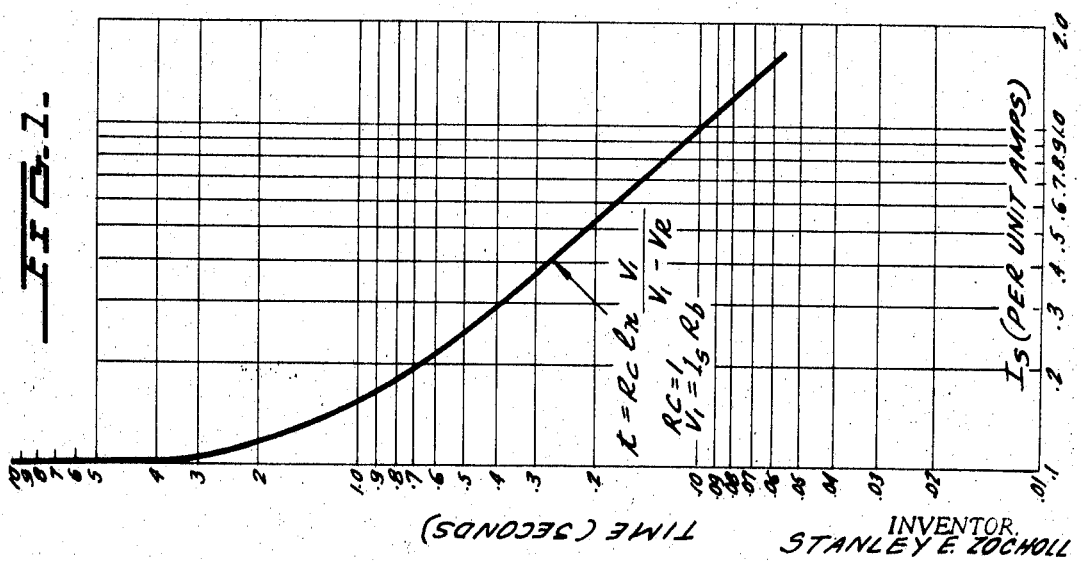
FIGURE 1 is a log-log plot showing the linear time-current characteristic.

The curve of FIGURE 1 resembles the inverse time-current curves of conventional overcurrent relays. However, as is required for successful operation, the conventional time-current curves fatten out at higher values of current, whereas the RC circuit response retains its negative one (minus 1) slope. It is, therefore, necessary to employ some shaping technique to give Equation 1 a slope substantially similar to conventional time-current curves.

This objective is advantageously achieved by allowing the current transformer, which is provided with a ferromagnetic core, to saturate at a particular current level which lies well within the operating range of the static relay.

The curve of peak output voltage of the saturating current transformer is derived as follows:

The flux in the current transformer is a linear function of current transformer output voltage until saturation occurs. At this point the flux density remains at a constant level regardless of increasing primary current introduced into the primary winding. Up to the point of saturation, the current transformer output voltage peak likewise remains a linear function of primary current. However at saturation, the relationship is defined as:

$$B_m = \frac{1}{NA} \int_0^{t_1} v\, dt \qquad (2)$$

where N is the current transformer output voltage and $$v = V_1 \sin \omega t \qquad (3)$$

and where:

$V_1 = I_S R_b$ volts
$I_S$ = Secondary current (peak)
$R_b$ = Burden resistance
$B_m$ = Saturated flux density
$A$ = C.T. core area.

Substituting Equation 3 into Equation 2:

$$WNAB_m = \int_0^{t_1} V_1 \sin \omega t\, w\, dt \qquad (3a)$$

Now, let $WNAB_m = V_m$ a constant $\qquad (3b)$

Substituting and integrating:

$$V_m = -V_1 \cos \omega t \int_0^{t_1} = V_1 - V_1 \cos \omega t_1 \qquad (3c)$$

Transposing terms of Equation 3c, $$\cos \omega t_1 = 1 - \frac{V_m}{V_1}$$

Since $\cos^2 \omega t_1 = (1 - \sin^2 \omega t_1)$ then $\qquad (3d)$ $$(1 - \sin^2 \omega t_1)^2 = 1 - \frac{V_m}{V_1} \qquad (3e)$$

Squaring both sides of Equation 3e, $$1 - \sin^2 \omega t_1 = 1 - \frac{2V_m}{V_1} + \frac{V_m}{V_1^2} \qquad (3f)$$

Transposing terms, $$-\sin^2 \omega t_1 = -\frac{2V_m}{V_1} + \frac{V_m^2}{V_1^2} \qquad (3g)$$

from Equation 3

$$\frac{v}{V_1} = \sin \omega t_1$$

then $$-\frac{v^2}{V_1^2} = -\frac{2V_m}{V_1} + \frac{V_m^2}{V_1^2} \qquad (3h)$$

and $$v^2 = 2V_m\left(V_1 - \frac{V_m}{2}\right) \qquad (4)$$

FIGURE 2A shows the peak output voltage of the saturating current transformer as a function of $V_1 = I_S R_b$. The output voltage $v = V_1$, until the value $V_m$ is reached. If the current transformer did not saturate $v$ would continue to increase in a linear fashion. However, at the value $V_m$, $v$ follows the parabolic curve of Equation 4 yielding a lesser signal at high input values. The resulting time-current characteristic is then given by:

$$t = RC \ln \frac{v}{v - V_R} \text{ where } v = \left[2V_m\left(V_1 - \frac{V_m}{2}\right)\right]^{1/2} \qquad (5)$$

It can be seen from this relationship that a reduced slope at high input currents is obtained:

The saturating current transformer, in addition to providing advantageous shaping qualities, further acts to limit the energy transferred to the static relay device. The lesser peak values and constant volt-time area of the output voltage acts to cut down component power requirements significantly and, therefore, increases relay reliability at high fault levels.

The principles exposed above have been applied in the circuit diagram shown in FIGURE 3. In this particular application the requirement was one for a time-current characteristic curve having a negative slope of 2 (—2) at one (1) per unit current when plotted on log-log paper. However, a slope of less than —2 is required at increased per unit current values.

As shown in FIGURE 3, the curernt carrying conductors being protected by the static overcurrent relay means may be three conductors 15A–15C of a three phase power distribution system. While the embodiment 10 of FIGURE 3 is shown for use in a three phase system, it should be understood that its utility may be equally applied in systems of greater and lesser phases. The current sensing circuit 11 of FIGURE 3 is comprised of three current transformers CT1–CT3, each being inductively coupled to one of three conductors 15A–15C, respectively, such that the conductors 15A–15C act as the primary winding with the secondary windings of the current transformers converting their outputs to a voltage drop across their associated burden resistors R8–R10, respectively. These fluctuating voltage signals are converted to D.C. signals by means of the three full-wave bridge rectifiers associated with each current transformer, the three-bridge rectifiers being comprised of diodes D1–D4; D5–D8; and D9–D12, respectively. One output point of each of the three-bridge rectifiers is tied to the common bus conductor 16 while the other output terminal of each of the three-bridge rectifiers is connected in common to the common bus 17. Since the outputs of the rectifiers are connected in parallel across the common bus conductors 16 and 17, the largest of the three outputs developed by these bridge-rectifiers appears across buses 16 and 17 and at terminals 18 and 19, respectively. The voltage appearing across terminals 18 and 19 is labeled $V_1$.

The voltage $V_1$ is impressed across the timing circuit 13 comprised of resistors $R_1$, $R_2$ and $R_3$ and capacitors $C_1$, $C_2$ and $C_3$. The operation of the timing circuit is set forth in detail in copending application Ser. No. 403,208 (C-1206) filed Oct. 12, 1964 and assigned to the assignee of the instant invention. It is sufficient for purposes of understanding the instant application, however, to understand that for a given input voltage $V_1$, a predetermined time delay will transpire before the output voltage of the timing circuit will achieve a predetermined voltage level constituting the threshold level at which the tripping operation will occur.

With a voltage $V_1$ being applied to timing circuit 13, the output voltage $V_0$ taken across terminals 19 and 20 of timing circuit 13 would begin to rise toward some steady state value. In order to prevent the charging of timing circuit 13 during the periods when the conductors 15A–15C are carrying normal current loads, the pickup circuit 12 of FIGURE 3 is provided to keep the output voltage $V_0$ equal to 0 until the voltage $V_1$ across terminals 18 and 19 attains a predetermined value $V_p$. $V_p$ will be produced by the lowest conductor current which is to operate the relay. The detailed operation of the pickup circuit 12 is set forth in detail in the aforementioned copending application and therefore a detailed description of the pickup circuit will be omitted herein for purposes of simplicity. It is sufficient, however, to understand that timing circuit 13 is prevented from beginning a time-out operation until the pickup voltage level $V_p$ is attained.

The pickup voltage level $V_p$ having once been attained causes transistor $Q_2$ to be turned off (i.e., driven into cut-off) so as to permit the timing circuit to time-out. After a predetermined time interval, dependent upon the value of input voltage level presented to the timing circuit, a voltage level at terminal 20 will be reached which is sufficient to operate the unijunction transistor $Q_3$ in a manner so as to turn on the silicon controlled rectifier SCR1. This operation, which is described in detail in the above mentioned copending patent application, provides a current path for relay or tripping coil 22 in order to initiate the tripping operation.

The timing circuit of FIGURE 3 yields a desired slope of two (2) over a 20:1 range of per unit current. Using the circuit of FIGURE 3 with a saturating current sensor yields the required time-current curve.

Figure 2:
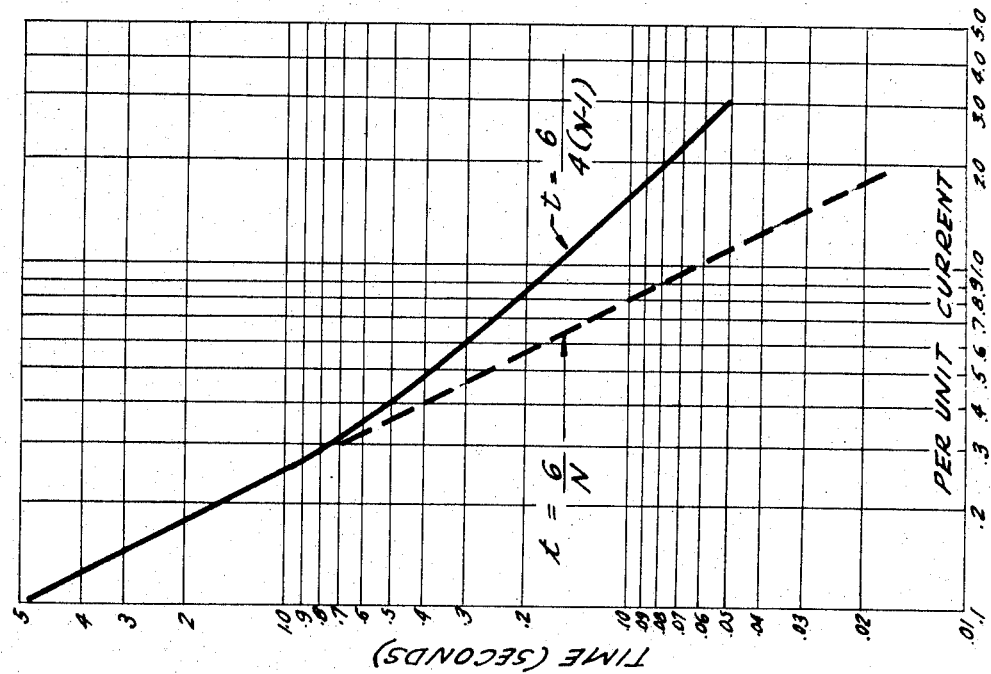
FIGURE 2 is a log-log plot showing two typical time-current characteristics obtainable through the transformer means of the instant invention.

FIGURE 2 shows the response of the timing circuit with linear current sensor input. This curve has the equation $t=6/N^2$. The response of this circuit is $$\frac{V_0}{V_1} = \left(\frac{t}{6}\right)^{1/2} \qquad (6)$$

where $V_0$=the fixed reference to which the timing circuit output must charge in order to initiate the trip signal. $V_1$ is the input D.C. voltage developed by the current sensor and the full-wave rectifier circuit.

To put Equation 6 in terms of per unit, let $V_1=NV_0$. Making this substitution in Equation 6 gives:

$$\frac{1}{N} = \left(\frac{t}{6}\right)^{1/2} \qquad (7)$$

When a current sensor is used which saturates at 2 per unit input, N in Equation 7 is replaced by $$[4(N-1)]^{1/2}$$

which is Equation 4 expressed in per unit. Therefore, the time response of the timing circuit becomes:

$$\frac{1}{[4(N-1)]^{1/2}} = \left(\frac{t}{6}\right)^{1/2} \qquad (8)$$

Therefore from Equation 6

$$t = \frac{6}{4(N-1)} \qquad (9)$$

Equation 9 is the desired time-current curve.

The current transformer for this application is designed as follows: Neglect transformer mutual impedance. Let $I_S$ equal secondary current at one per unit input. Let $R_s$ equal transformer burden resistance. Therefore, at two (2) per unit input $V_m = 2I_S R_b$.

From the above discussion $$V_m = I_S R_b = WNAB_m \qquad (10)$$

For a given core material $B_m$ is the point at which saturation starts. Also $I_S$, $R_b$ and $w$ are known. Here N is the transformer turns. N is calculated from $I_S$ and the desired primary current of the transformer.

Therefore, Equation 10 gives the required core cross-sectional area.

FIGURE 4 is a sectionalized perspective view showing a preferred embodiment of a current sensor (current transformer) useful in the static relay of the instant invention. As shown in FIGURE 4, the current sensor 25 is comprised of a ferromagnetic core 26 whose saturation level is selected so as to occur at the value $B_m$ and whose cross-sectional area is determined from Equation 10. Between the saturable core and the wire coil 26 forming the secondary winding of the current sensor, is a layer of insulation 28 wound about the entire core assembly. The material may be a tape such as any conventional insulation tape having a cotton or polyvinyl chloride base. However, any other suitable insulating material may be employed.

The secondary windings of coil 29 are wound in a toroidal fashion so that the secondary is of a doughnut shape. A number of turns N is determined from Equation 10. The doughnut shaped core 26 having insulation layer 28 and coil 27 is then encased in a suitable insulating material such as an epoxy to form the toroidal outer casing 29. The primary winding such as, for example, the winding 15A is preferably surrounded by a suitable insulating tube 30. Also a suitable bonding type insulation material is placed within the toroidal opening so as to position and support the primary winding 15A relative to the central opening of the current sensor. Whereas the embodiment of FIGURE 4 is preferred in applications of the type set forth herein any other suitable configuration may be employed, depending only upon the needs of the user.

It can be seen from the foregoing that the instant invention provides a static relay device employing a current transformer with controlled saturation so as to reduce the power delivered to a static circuit, thereby increasing circuit reliability at high currents. At the same time the saturation characteristic of the current transformer yields an advantageous curve shaping characteristic.

Although there has been described a preferred embodiment of this novel invention, many variations and modifications will now be apparent to those skilled in the art.

What is claimed is:

1. For use in a static relay device responsive to current in a circuit being protected comprised of a current transformer coupling said circuit being protected to said static relay device; a rectifier circuit coupled to the output of said current transformer; a trip initiating means coupled to said rectifier responsive to a first predetermined voltage level, an RC timing circuit and pick-up circuit directly coupled to the output of said rectifier for causing said timing circuit to time out when said pick-up circuit detects a second predetermined threshold voltage level, the improvement comprising a current transformer having a saturable core;

a secondary winding wound about said saturable core;
   said core being magnetically coupled to the circuit being protected; said secondary winding being magnetically coupled to said core and electrically coupled to said pick-up circuit for controlling the operation of the pick-up circuit;
   said static relay deriving all of its operating power exclusively from the output of said rectifier and being operable over a predetermined current range between normal and high magnitude current amplitude;
   said saturable core being designed to saturate at a point below the upper end of said current range.

2. The static relay device of claim 1 wherein the upper limit of said current range is approximately 20 times as great as the lower limit and wherein the non-linear operation of said saturable core occurs at a current of less than twice the lower limit.

3. The static relay device of claim 1 wherein said saturable core is comprised of a ferromagnetic material having a toroidal configuration;
   said secondary winding being wound in toroidal fashion about said core;
   a burden resistor coupled across said secondary winding;
   the saturation level of said core being determined from the equation $$V_m = I_S R_b = WNAB_m$$

where:
$R_b$ = resistance of the burden resistor
$I_S$ = current in the secondary winding
$V_m$ = maximum voltage drop developed across the burden resistor;
$W$ = frequency of the current
$N$ = number of turns of the secondary winding
$A$ = cross-sectional area of the saturable core
$B_m$ = value of magnetic field strength at which saturation starts.

4. The device of claim 3 further comprising rectification means coupled between said secondary winding and said burden resistance for full-wave rectifying the input signal.

5. The device of claim 3 further comprising first means for electrically insulating said secondary winding from said core;
   epoxy means encapsulating said core, coil and first means.

References Cited
UNITED STATES PATENTS

| | | | |
|---|---|---|---|
| 3,202,876 | 8/1965 | Mathews et al. | 317—36 |
| 3,214,641 | 10/1965 | Sonnemann | 317—33 X |

JOHN F. COUCH, *Primary Examiner.*

J. D. TRAMMELL, *Assistant Examiner.*

U.S. Cl. X.R.

317—36; 336—174